Dec. 23, 1952 M. A. EDWARDS ET AL 2,622,393
FUEL REGULATING APPARATUS FOR AIRCRAFT GAS TURBINE POWER PLANTS
Filed July 19, 1945 2 SHEETS—SHEET 1
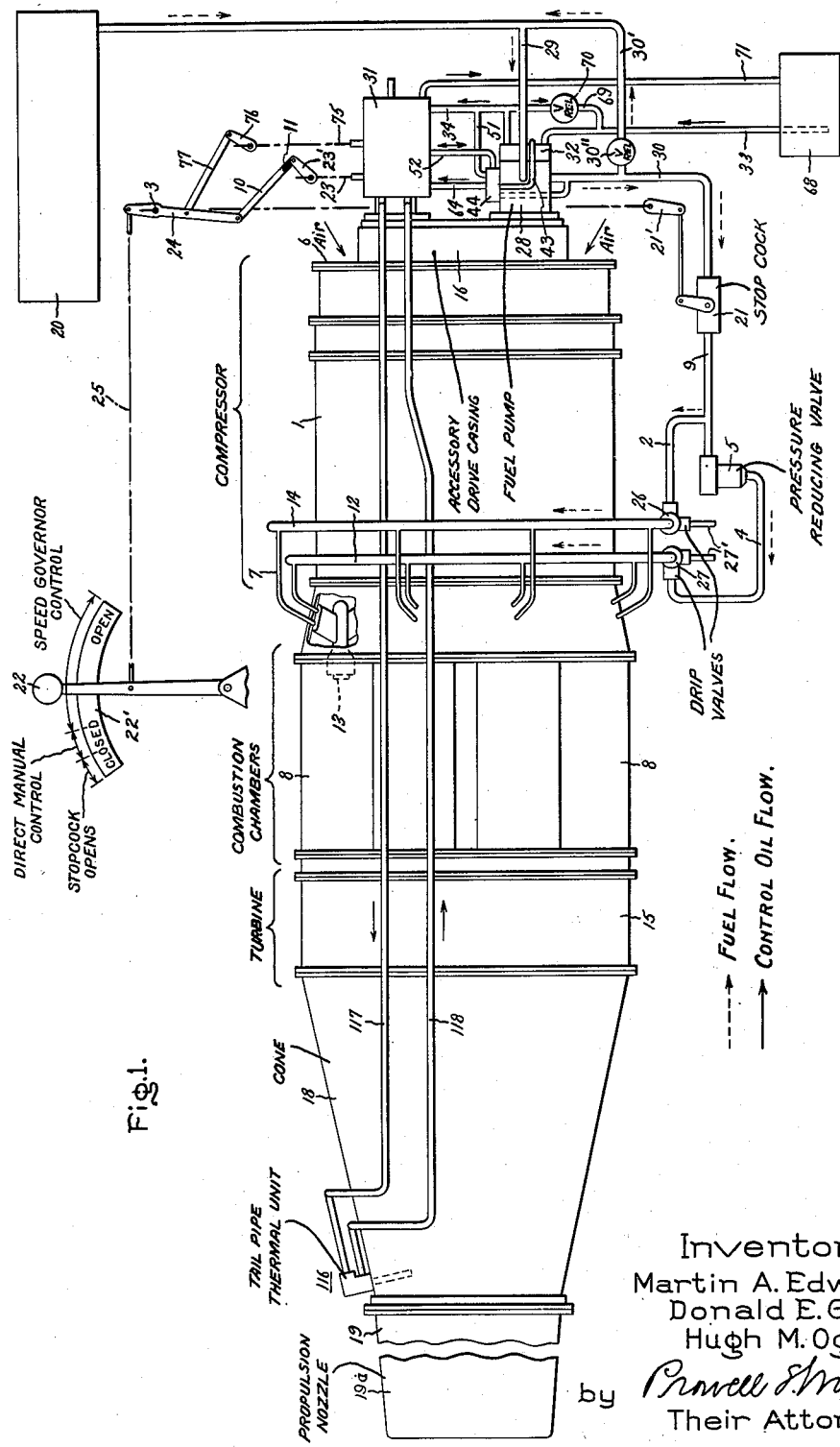
Inventors:
Martin A. Edwards,
Donald E. Garr,
Hugh M. Ogle,
by Prowell P. Mack
Their Attorney.

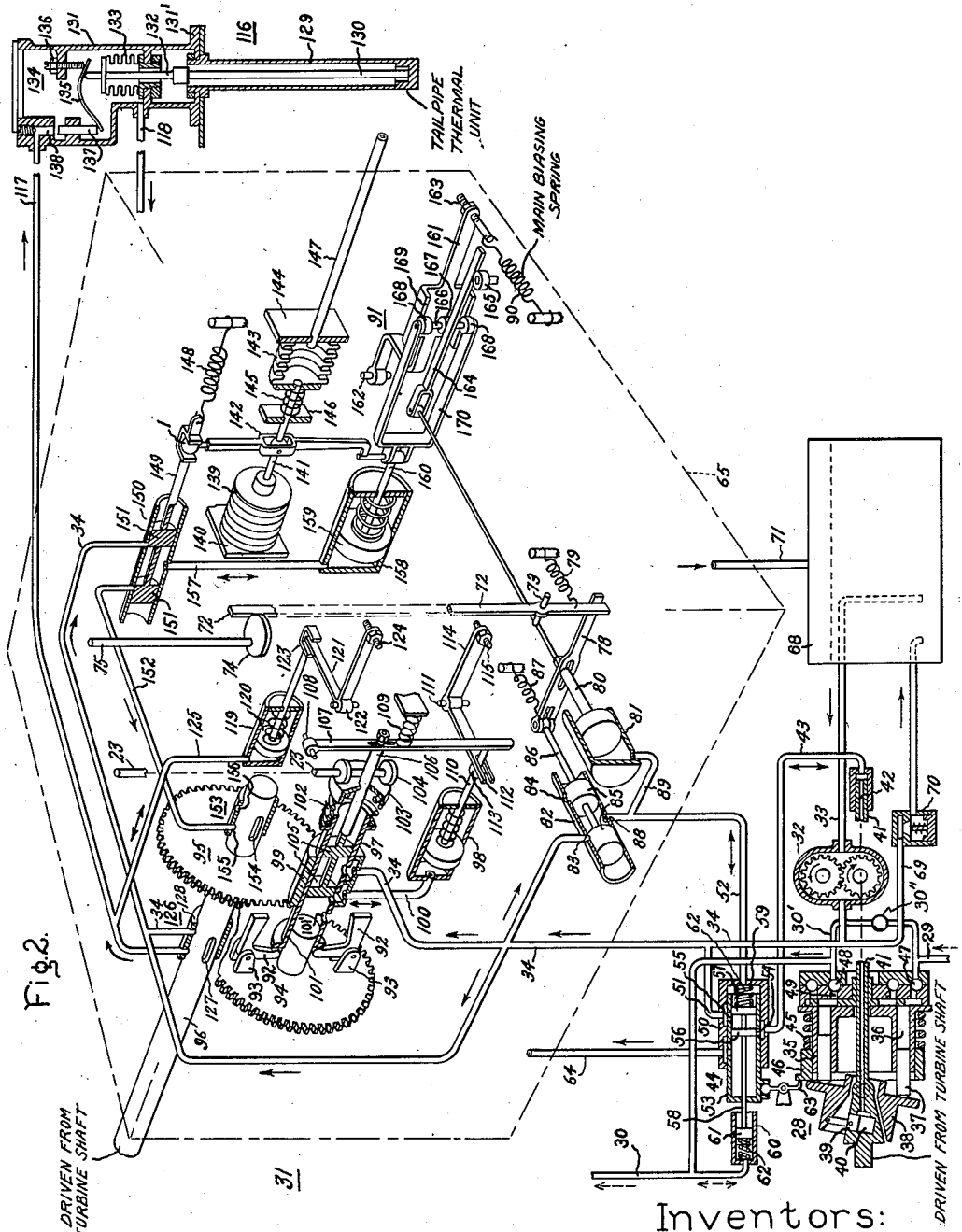

Patented Dec. 23, 1952

2,622,393

UNITED STATES PATENT OFFICE 2,622,393

FUEL REGULATING APPARATUS FOR AIRCRAFT GAS TURBINE POWER PLANTS

Martin A. Edwards, Scotia, and Donald E. Garr and Hugh M. Ogle, Schenectady, N. Y., assignors to General Electric Company, a corporation of New York Application July 19, 1945, Serial No. 605,960

12 Claims. (Cl. 60—39.28)

1

The present invention relates to gas turbine power plants and control mechanism therefor, and is of particular significance in connection with turbines for jet propulsion of aircraft. Aircraft gas turbines present difficult control problems due to the various changes of operating conditions to which they are subjected. These variations cover wide ranges of ambient atmospheric pressure, temperature, speed, and load, necessitating correspondingly great changes in the rate of fuel supply. Ordinarily the lowest fuel supply is needed during idling operation at high altitude, and the maximum fuel supply is required for full power at sea level.

An object of our invention is to provide an improved control system for a gas turbine powerplant. Another object is to provide a control mechanism for varying the rate of fuel supply in such a powerplant in response to changes in a combination of various operating conditions. A further object is to provide improved components of such control mechanism whereby efficient control, safe operation, and long life of the powerplant are assured.

Further objects and advantages will be apparent from the following description and the claims appended thereto taken in connection with the accompanying drawings, in which Fig. 1 illustrates a gas turbine jet engine for aircraft with a fuel system arranged and controlled in accordance with our invention; and Fig. 2 is a diagrammatic perspective view of the control mechanism for the fuel system shown in Fig. 1.

The powerplant of Fig. 1 comprises the housing 1 containing an air compressor, which may be of the multistage axial flow or centrifugal type. The casing 1 has an inlet 6 arranged to receive air from suitable intake openings in the engine nacelle (not shown) which openings may face in the direction of flight with the passage to the inlets 6 arranged as a diffuser to convert part of the dynamic pressure of flight into static head at the inlets 6. The air is compressed as it passes through the compressor and is discharged into a plurality of combustion chambers or "combustors" 8 circumferentially arranged about the axis of the engine. The combustors may be of the type disclosed in application for patent Serial No. 501,106, filed on September 3, 1943, now abandoned, and in Patent No. 2,601,000 (a continuation-in-part of application Serial No. 501,106) in the name of Anthony J. Nerad and assigned to the same assignee as the present application. Fuel is supplied by a nozzle 13 projecting into one end of each combustor and connected to fuel

2 manifolds 12 and 14. Because of the wide range of operating loads to be obtained, the fuel-burning system is of a type adapted to provide a rate of fuel flow which changes as a predetermined function of the fuel pressure, at the inlet point 9 to the burner system, over a wide range of pressures. The fuel burning system shown comprises a direct connection 2 from the main fuel supply conduit 30 to the high pressure manifold 14, a second connection 4 through a pressure-reducing valve or "flow divider" 5 to the low pressure manifold 12, and suitable branch connections 7 from the manifolds to the respective fuel nozzles 13. "Drip valves" 26 and 27 are provided at the lowest points in the high and low pressure manifolds, respectively, and are arranged to automatically open and drain the fuel manifolds through conduits 27' when the engine stops and the pressure in the fuel system drops to a preselected minimum value. This fuel-burning system is more fully disclosed in an application Serial No. 622,604 filed in the name of Charles D. Fulton on October 16, 1945, now Patent No. 2,590,853, and assigned to the same assignee as the present application.

Hot gases from the combustors 8 pass to a gas turbine in the housing 15, whence they pass through the cone 18 to the tailpipe 19, which leads to any suitable type of propulsion nozzle 19a. The gas turbine is of course arranged to drive the air compressor. The details of the compressor, combustors, and turbine are not necessary to an understanding of the present invention, particular arrangements being more fully described in other applications, specifically Serial No. 541,565, filed June 22, 1944, and Serial No. 506,930, now Patent No. 2,479,573, filed October 20, 1943, in the name of Alan Howard, and Serial No. 525,391, now Patent No. 2,432,359, filed March 7, 1944, in the name of Dale D. Streid.

At the forward end of the engine is an accessory drive gear casing 16 provided with a number of projecting splined shafts for driving various engine accessories secured to the front of the casing 16. These accessories may include many not shown in Fig. 1, such as an electric generator, starter motor, ignition devices, hydraulic power pump, vacuum pump, tachometer drive, and various other electrical and hydraulic mechanisms. Such an accessory drive section is disclosed in an application Serial No. 525,389, now Patent No. 2,432,358, filed March 7, 1944, in the name of Donald F. Warner and assigned to the same assignee as the present application.

Mounted on one of the accessory drive pads is a fuel pump 28 having an inlet conduit 29 connected with the main fuel tank 20 and a discharge conduit 30 carrying the main fuel supply through a shut-off valve or stopcock 21 to the point 9 at which the fuel enters the fuel-burning system referred to above. The pump 28 is illustrated as being of the variable stroke positive displacement type. The pump displacement is varied by a control mechanism or regulator 31 also mounted on the accessory drive casing 16 and receiving oil or like operating fluid under pressure from a second positive displacement pump 32, which has an inlet 33 for connection to a source of control oil and discharges into a conduit 34 connected to the regulator 31. Both the fuel pump 28 and the control oil pump 32 are driven by the turbine through the gearing in casing 16.

The fuel supply to the nozzles 13 in the combustors 6 is caused to vary by the action of the regulator 31 in response to changes in several operating conditions, as will be more fully described hereinafter.

Oil pumps

As previously pointed out, the fuel rate in a gas turbine powerplant of the type described must be varied continuously over a wide range, of the order of 1 to 20, from idling to full load operation. Such performance may be obtained with a variable stroke positive displacement pump such as pump 28 (see Fig. 2), which comprises a casing 35 forming a plurality of circumferentially spaced axial cylinders 36 each accommodating a reciprocating piston 37. The outer ends of the pistons are engaged by a wobble member 38. The angular relation of the member 38 to the axis of the pump is controlled by a servomotor including a piston 39 having a rod connected to the member 38 and slidably disposed in a pressure chamber 40 formed in an enlarged extension of a shaft 41. Shaft 41 has a central bore 42 connecting the pressure chamber 40 to a pipe 43, which latter is connected to a control valve 44, the function of which is to vary the pressure of oil in the chamber 40. Supply of oil to the chamber 40 by valve 44 forces the piston 39 outward, thereby increasing the angularity of wobble member 38 and increasing the stroke of the pistons and the displacement of the pump 28. Upon draining of liquid from the chamber 40, the angularity of the wobble member is decreased. The flow becomes zero when the driving face of the wobble member is perpendicular to the shaft 41 and the angularity is zero. Wobble member 38 is biased against the oil pressure in chamber 40 by a helical spring 45 surrounding the casing 35, bearing at its right-hand end against a flange of the casing and at its left-hand end against an axially slidable ring 46. The inlet conduit 29 of the pump communicates with an annular channel 47 having a plurality of axial ports which establish connection with certain of the cylinders during a portion of the cycle of operation, while the discharge conduit 30 is connected by similar ports and another annular channel 49 of the pump to the remaining cylinders from which liquid is discharged during the same part of the cycle. It will be understood by those skilled in the art that the pump shown in Fig. 2 is merely a diagrammatic representation of one type of variable positive displacement pump which is well known, and other suitable pumps of this type can be used as well.

A bypass conduit 30' including a pressure relief valve 30'' prevents fuel pump discharge pressure from exceeding a predetermined safe value.

The device 44 for controlling the stroke of the pistons 37 comprises a casing 50 having an inlet port 51 for receiving high pressure oil from the supply conduit 34 and another port connected to a conduit 52 for receiving oil from regulator 31 under a variable control pressure. The pressure of the oil in conduit 34 is relatively constant at for example 250 lbs. per square inch (except for slight variations due to the characteristics of pump 32 and valve 70), whereas the control pressure oil in conduit 52 varies with varying operating conditions, as will be described hereinafter. Bushing 53 is slidably disposed in the casing 50 and has axially spaced ports 54 and 55 controlled by valve discs 56 and 57 secured to a rod 58. In the position shown, head 56 covers the port 54, thhereby interrupting communication between the high pressure line 34 and the conduit 43 leading to the pressure chamber 40 for controlling the fuel pump. The head 57 and the casing form a control pressure chamber 59 connected to the conduit 52. The force of the fluid pressure in the chamber 59 against the valve head 57 is opposed by a pressure-sensing piston 61 in cylinder 60 and connected to an extension of the valve rod 58. The cylinder 60 is connected to the discharge conduit 30 of the fuel supply pump so that piston 61 is responsive to gage pressure of the fuel in conduit 30. Piston 61 and the valve member 56, 57, 58 are biased into a neutral position by two opposed centering springs 62 engaging opposite faces of the piston 61 and the valve head 57. Bushing 53 is pivotally connected to a follow-up lever 63 which has an intermediate portion held on a fixed fulcrum and an end portion engaging the axially slidable ring 46 of the fuel pump. The control valve 44 has a relief conduit 64 which is connected for convenience to the casing of regulator 31, from which oil drains by conduit 71 back to the control oil reservoir 66.

During steady state conditions the fuel supply pressure sensed by the piston 61 in the cylinder 60 balances the pressure in the control chamber 59 of the valve, and the valve disc 56 covers the port 54 leading to the conduit 43. For any given set of operating conditions, the pressure in the control cylinder 40 of the pump remains constant. Upon increase of the control pressure in chamber 59, the valve discs are forced to the left against the pressure in the cylinder 60, causing flow of control oil from the conduit 34 through the conduit 51, valve 44, conduit 43, and the bore 42 of the pump shaft, into the chamber 40, causing movement of the wobble member 38 to increase the stroke and accordingly the discharge pressure of the pump 28. This increased discharge pressure is communicated to the cylinder 60 where the piston 61 moves to the right, causing the valve disc 56 to assume its original line-in-line position with the port 54.

Thus it is seen that the piston 61 provides follow-up action for the control valve member 56, 57, 58. However, the time lag between a change in pressure in the chamber 59 of the valve and the restoring movement of piston 61 may cause hunting and instability of operation. The lever 63 between the bushing 53 of the valve and the ring 46 of the pump constitutes direct mechanical follow-up means for reducing the effective time lag, thereby preventing hunting.

As pointed out above, the movement of the valve disc 56 to the left causes increased stroke of the pump pistons, effected by increasing the angularity of the wobble member 38 whereby the latter forces the ring 46 toward the right against the biasing force of the compression spring 45. This in turn permits counterclockwise movement of the lever 63 about its fulcrum under the biasing influence of the pressure in chamber 59 acting on the end of bushing 53, whereby the latter is moved toward the left to effect at least partial restoring of the original relative position between the valve disc 56 and the port 54 in the bushing. Normally bushing 53 is held stationary by the lever 63, which prevents it from movement toward the left by the fluid pressure in the chamber 59 acting against the right-hand end of the bushing.

It will be seen that fuel pump 28 and its control valve 44 constitute means for delivering liquid fuel to conduit 30 at a pressure which is a predetermined function of a variable control pressure supplied to the valve 44, the relation between the two pressures depending on the proportioning of the pistons 57, 61 and the characteristics of springs 62.

Control oil is supplied to the valve 44 by the conduit 51 connected through pipe 34 to the discharge side of control oil pump 32. The latter may be of the well-known gear type, as shown in Fig. 2, and may be driven from the shaft 41 of the fuel pump 28. The inlet conduit 33 of the control oil pump is connected to a reservoir 68. In order to prevent excessive pressures in the discharge conduit 34, a bypass 69 with a pressure relief valve 70 is provided between the conduit 34 and the tank 68.

*Regulator*

Referring now to the regulator for establishing the control pressure in the chamber 59, a number of distinct condition-responsive control devices are provided to vary the control pressure automatically in response to changes of certain operating conditions, as well as other mechanism for manipulation by the operator to select the load output of the powerplant. The automatic control means act to maintain substantially constant the load output selected by the operator while safeguarding the engine from overspeed and excessive temperature conditions.

*Manual control*

As may be seen in Fig. 2, the manual control mechanism comprises a main control lever 72 having an intermediate portion supported on a pivot 73. A lever portion above the pivot 73 is engaged by a manually adjustable cam 74 secured to a shaft 75, which latter has an end portion connected by an arm 76 (see Fig. 1) to a link 77 for manipulation by the operator or pilot through hand lever 22, link 25, and lever 24, which latter is pivoted on fulcrum 3. Movement of the hand lever 22 causes rotation of the cam 74, effecting turning movement of the main control lever 72 about the pivot 73. The lower end of the lever 72 is held in engagement with a control and follow-up lever 78 by the action of a tension spring 79 connected to the lower end of the lever 72. Lever 78 has an intermediate slotted portion connected to a stem 80 of a hydraulic motor 81 controlled by a pilot valve 82 having an inlet port 83 connected to the control oil supply conduit 34 and a drain port 84 discharging into the casing 65. Pilot valve 82 has discs 85 secured to a stem 86 connected to the left-hand end of the lever 78 and biased toward the right by a tension spring 87. The discs 85 normally are in aligned position with the respective ports 83, 84. A third port 88 is located between the discs 85 and connected to the conduit 52 which latter has a branch 89 connected to the pressure chamber of the servomotor 81. The stem 80 with the piston of the servomotor 81 are biased against the fluid pressure in the servomotor by means of a tension spring 90 acting on the piston through a variable moment arm arrangement 91 described more in detail hereinafter. For the present it is sufficient to note that the force produced by the servomotor 81 on rod 80 is balanced by a force produced by the spring 90.

During operation a pull on the manual control link 77 causes decreased fuel supply and accordingly decreased speed and output of the engine. More specifically such pull on the link 77 causes counterclockwise turning movement of the cam 74, thus forcing the main control lever 72 clockwise about its pivot 73, against the biasing force of the spring 79. The lower end of the lever 72 tends to move away from its engagement with the lever 78. The engagement between the levers 72, 78, however, is maintained by action of the spring 87 which turns the lever 78 clockwise about its pivotal connection with the stem 80. This causes movement of the pilot valve discs 85 to uncover the drain port 84, permitting discharge of fluid from the hydraulic motor 81 and the pressure chamber 59 through the conduits 89 and 52, resulting in decreasing pressure in the pressure chamber of the motor 81 and the control pressure chamber 59 of the valve 44. Decreasing pressure in the valve chamber 59, as explained above, causes decreased discharge pressure of the pump 28 and accordingly decreased fuel flow to the combustors 8. Decreased pressure in the servomotor 81 causes the piston to move toward the left by action of the spring 90, whereby the left-hand end of the lever 78 effects restoration of the aligned position of the valve discs 85. Similarly, a push on the link 77 causes clockwise turning movement of the cam 74, effecting operation of the various elements in a direction opposite to that described before, resulting in increased fuel supply to the combustion chambers.

The manual control mechanism thus comprises a fluid pressure motor having a pilot valve positioned by the operator to impart to valve 44 a control pressure corresponding to the desired output.

*Speed control*

Speed control means are provided to take over control of the powerplant upon increase of the speed above a preselected value. In the present embodiment, this speed control comprises a centrifugal speed responsive device including flyweights 92 pivotally held on fulcrums 93 secured to a gear 94. The latter meshes with a gear 95 secured to a governor drive shaft 96 driven by a stub shaft projecting from the gear casing 16. Flyweights 92 operate a pilot valve 97 for controlling a speed sensing cylinder 98. The pilot valve 97 has a stationary casing 99 with spaced openings connected to the pressure supply line 34 and to a conduit 100 which has another end connected to the cylinder 98. A bushing 101 is slidably disposed in the casing 99 and at its left-hand end provided with a flange engaged by the flyweights 92. The right-hand end of the bushing is engaged by a variable compression spring 102 which at its right-hand end bears against a cap 103 freely slidable on rod 106 and adjustable by means of a pair of cams 104 which bear against the top surface of the cap and are arranged to be positioned by rotation of the shaft 23. The bushing 101 has two spaced ports communicating with line 34 and the conduit 100 respectively and controlled by valve discs 105 secured to rod 106 which at its right-hand end is pivotally connected to a lever 107 by means of a slot connection. The lever 107 is fulcrumed at its upper end on a pivot 108. The lower end of the lever is biased by a compression spring 109 against the right-hand end of the stem 110 of the motor 98. The stem 110 is connected to the main control lever 72 by means of a bellcrank lever rotatably supported on a pivot 111 and having a forked end 112 associated with an abutment 113 on the stem 110 and another arm 114 with an adjustable threaded pin 115 arranged to engage the main control lever 72.

During operation on direct manual control through cam 74, the speed governor being ineffective (as shown in Fig. 2), bushing 101 will be at the extreme left end of its range of movement, so that liquid from motor 98 will be drained to the left of piston 105 and through port 101' to the interior of casing 65, thus preventing displacement of the piston in servomotor 98. Upon an increase in speed the flyweights 92 move outward under centrifugal force, thereby pushing the bushing 101 to the right against the biasing force of the spring 102. Movement of the bushing 101 to the right establishes communication between the ports of the bushing, thus causing the flow of oil from the supply line 34 into the conduit 100 and the pressure chamber of the motor 98. The piston of the motor 98 is thereby forced to the right, causing counterclockwise turning movement of the bellcrank about the pivot 111 and moving the pin 115 toward the main control lever 72, while the connection between lever 107 and rod 106 results in restoration of the pilot valve to shut off the supply of liquid to motor 98. At a preselected speed the pin 115 engages the lever 72, and upon further increasing speed moves the lever 72 away from the cam 74. Thus at a predetermined speed the governor takes control of lever 72 away from the direct manual control means 74—77.

As the main control lever 72 is moved away from the cam 74 the pilot valve 83 is actuated to cause discharge of oil from the pressure chamber of the motor 81 and from the chamber 59 of the valve 44, resulting in decreased fuel supply to the combustors in the manner explained above. Upon movement of the stem 110 of the servomotor 98 toward the right, the lever 107 is turned counterclockwise about the pivot 108 and thereby restores the pilot valve discs 105 to their original position relative to the ports in the bushing.

Upon decreasing turbine speed the operation is similar to that described above, with the various elements moving in opposite direction and producing increasing fluid flow to the combustors. With decreasing speed, the lever 72 moves counterclockwise and engages the cam 74; and upon further decrease in speed the threaded pin 115 moves away from the lever 72, the speed governing mechanism thereby being rendered ineffective and the control of the plant being transferred back to the direct manual control mechanism (and the other control devices described hereinafter).

*Temperature control*

The efficiency, economy of operation, and life of a gas turbine powerplant vary considerably with the operating temperatures. We have discovered that a practical and satisfactory criterion of the general temperature level at which an aircraft gas turbine jet engine is operating is the temperature of the gases discharged from the turbine. In general, the efficiency and economy of the jet engine increases with increasing temperature level, while the life decreases. Hence, it is desirable to operate such a powerplant at the maximum safe temperature level consistent with the required life expectancy. This is accomplished in accordance with our invention by the provision of means permitting operation up to a predetermined maximum temperature of the turbine exhaust gases but preventing operation at temperatures above that value in order to prevent excessive stresses and premature deterioration of the various structural elements of the powerplant.

In a preferred embodiment, temperature control means are provided which include mechanism arranged to act on the main control lever 72 through a lost motion connection so as to be normally ineffective and rendered operative only as the limiting temperature is exceeded. Upon exceeding the temperature limit it is desirable in the interest of safety that the thermal means quickly take over control of the fuel supply and effect a rapid decrease in fuel pressure; whereas upon decrease in temperature it is desirable in the interest of stability to increase slowly the fuel supply to the combustion chambers, so as to prevent too rapid an increase in temperature with the accompanying danger of overshooting the limiting value.

The means shown in the drawings for accomplishing these objects includes a thermal unit 116 secured in the tailcone 13. While only one thermal unit is illustrated in the drawings, it will be understood by those skilled in the art that several similar units, circumferentially spaced and connected in parallel, may be used to obtain an indication of average temperature over the entire cross-section of the tailcone. The thermal unit is connected to an inlet conduit 117 and a discharge conduit 118 emptying into the regulator casing 65. The function of the thermal unit (or units) is to establish a control pressure for a temperature sensing cylinder 119 (Fig. 2) having a spring-biased piston 120 connected by lost motion means to a bellcrank 121 fulcrumed on a pivot 122 and having one arm associated with a U-shaped member 123 secured to the end of the stem of the servomotor 119. The other arm of the bellcrank has a threaded pin 124 adjustably secured to its end and arranged to engage the main control lever 72. The pressure chamber of the servomotor 119 is connected by a conduit 125 to conduit 117.

Control oil under pressure is supplied to the conduits 125 and 117 from the supply conduit 34 through a rotary flow limiter 126 comprising a portion of the shaft 96 with an axially extending slot 127 disposed within a stationary sleeve 128. Axially spaced portions of the sleeve are connected to the conduits 34 and 117 respectively. During rotation of shaft 96, the slot 127 effects periodic communication between the conduits 34 and 117. The rotating slot 127 and the ported sleeve 128 constitute a "rotary restrictor" presenting a resistance to the flow of liquid from the supply conduit 34 to the conduits 125, 117, which resistance depends primarily upon the length and width of the slot 127. This rotary flow limiter has the very great advantage of producing a desired "effective resistance" to flow without resorting to small flow-limiting orifices which might become fouled by dirt in the control oil. The rotary flow limiter is not subject to this danger because the passages are all of relatively large cross-section. While the slot connects the conduits it permits substantially free flow therethrough. The restriction of the flow is due to the rapid successive periodic interruption of the flow path between the conduits 34, 117. It will be understood that the speed of rotation of shaft 96 is sufficiently great that the average rate of flow past the rotary restrictor is substantially constant.

The flow of fluid from the conduit 34 into the conduit 117, and accordingly the pressure in the pressure chamber of the servomotor 119, is determined by operation of the thermal control means 116. The device 116 comprises means responsive to temperature changes and a valve associated with the conduit 117 for controlling the oil flow therethrough. More specifically, the temperature-responsive means in the present example includes an outer tube 129 and an inner rod 130 centrally disposed within and suitably secured to the lower end of the tube 129. The tube and the rod are made of materials having different coefficients of expansion. For example, the tube 129 may be of a suitable high temperature metal such as Nichrome and the rod 130 may be of fused quartz. The upper end of the metallic tube 129 is secured to a flange 131'. The inner rod 130 is provided with an extension 132 sealed to the casing 131 by means including a bellows 133, the lower end of the bellows being sealed to the casing 131. The upper end of the extension 132 projects into a chamber 134 and engages a lever, in the present instance in the form of a cantilever spring 135 which has a right-hand end engaging an adjusting screw 136 and a left-hand end engaging a plunger 137. The member 137 is associated with an outlet 138 of the conduit 117. Movement of the member 137 toward the outlet 138 increases the resistance to flow of fluid therethrough and thereby increases the pressure within the conduit 117, and also in the chamber of the temperature-sensing servomotor 119. Conversely, movement of the plunger from the outlet 138 reduces the resistance to flow from the outlet 138 and accordingly reduces the pressure in the conduit 117 and the pressure chamber of the servomotor 119. Control oil discharged from conduit 117 into chamber 134 is drained through conduit 118 back into the regulator casing 65, thence through pipe 71 to tank 68.

Upon increase in temperature the metal tube, having a higher coefficient of expansion than the inner quartz rod 130, expands downwardly, and thereby causes collapsing of the bellows 133. This effects downward or opening movement of the plunger 137, resulting in decreased pressure in the servomotor 119. The spring-biased piston 120 thereupon moves to the left causing counterclockwise turning movement of the bellcrank which in a certain predetermined position engages the main control lever 72, and upon increase in temperature thereafter the thermal device takes over the control of the engine.

As previously pointed out, clockwise turning movement of the main control lever 72 about the pivot 73 effects decreased fuel supply to the combustion chambers, while counterclockwise movement results in increased fuel supply. In case of rising temperature, a quick control action takes place because opening or downward movement of the plunger 137 causes quick emptying or relief of the pressure in the chamber of the servomotor 119 through the conduits 125, 117. It is important to note that in this action the rotary restrictor 126 has no effect on the rate of response of the thermal control because the restrictor is outside the fluid circuit connecting the temperature sensing cylinder 119 and the thermal device 116. On the other hand, upon decreasing temperature, when the plunger or valve member 137 is moved toward the outlet 138, there is a less immediate response of the piston 120, because such movement requires first the supply of control oil from the conduit 34 through pipe 125 into the cylinder 119, which supply is retarded by the flow restrictor 126. Thus there is obtained a slow response of the temperature control mechanism with decreasing temperature, as compared with the prompt action produced with increasing temperature.

The tailpipe or turbine discharge temperature at which the thermal device takes over control is a function of the load output selected by the manual control mechanism. The higher the load setting selected by the operator, the lower the temperature at which control is taken over by the temperature-responsive mechanism, because with increasing load the amount of lost motion between the main control lever 72 and the bellcrank 121, 124 is reduced. Hence, the point at which the thermal devices take over control is a function of both turbine discharge temperature and the load setting. This is necessary because the prime purpose of the thermal control is to prevent excessive temperatures of critical parts, particularly the turbine bucket-wheel; and the mean turbine temperatures are a function of inlet temperature, pressure drop across the turbine, and various other minor factors such as reheat in the turbine bucket passages due to friction losses. It has been found by experience that the turbine discharge temperature is a satisfactory and reliable indication of the mean powerplant temperatures when thus modified in accordance with the load setting, which latter may be considered to represent a measure of the temperature drop across the turbine.

For a given load setting the temperature control mechanism may be adjusted by positioning the threaded pin 124 on the bellcrank or by positioning the screw 136 of the thermal device 116. It should be noted that the critical temperature, at which the thermal device becomes effective, varies only as a function of load setting, since, as described elsewhere herein, a given position of the lever 72 corresponds to a given load setting regardless of altitude.

It is to be noted that the pressure of the control oil supplied to the thermal device from conduit 34 may not be entirely constant during operation. However, the spring-biased piston 137 acts as a pressure regulating device to hold the pressure in line 117 (and servomotor 119) constant, so that the pressure will vary to actuate the temperature-responsive piston 120 only when the thermal device 134 dictates a change in pressure.

It may be noted that the variations of the pressure in line 117 have the effect of preventing sticking of piston 137.

To summarize, our invention includes a control means responsive to temperature changes of the turbine exhaust gases for taking over control of the powerplant at a preselected maximum safe temperature, the critical temperature being a function of the output, increasing with decreasing load and vice versa. The arrangement includes means effecting rapid response by the temperature-responsive mechanism upon increase in temperature but effecting a slow control action upon decrease in temperature.

Altitude control

The efficiency of a gas turbine powerplant is a function of a number of factors, an important one being the energy level at which the turbine operates. Generally efficiency increases with increasing initial turbine temperature and with increasing pressure drop across the turbine. The turbine nozzlebox pressure and temperature in a jet engine of the type referred to herein is a function of the rate of fuel supply and the compressor discharge pressure; while the turbine exhaust pressure is a function of altitude, decreasing with increasing altitude. Therefore, it will be seen that efficiency and output would vary with altitude unless suitable compensating means were provided. An important feature of our invention is the provision of means for recalibrating the regulator in response to changes of some pressure appurtenant to the operation of the powerplant, which pressure varies as a function of altitude. Furthermore, with increasing altitude the over-all efficiency of a jet-propelled aircraft having a gas turbine powerplant increases by reason of decreased drag and other factors; therefore, at high altitude less fuel is required for a given propulsion effect than at low altitude. According to our invention mechanism is provided responsive to changes of a pressure which varies as a function of altitude for varying the fuel rate.

This altitude responsive mechanism comprises a device responsive to variations in absolute atmospheric pressure, and includes an evacuated bellows 139 held at its left-hand end on a fixed support 140 and connected at its right-hand end to a rod 141 pivotally connected to an intermediate point of a lever 142. A second bellows 143 is secured at its right-hand end to a fixed support 144 and is connected at its left-hand end to an extension of the rod 141. Bellows 143 is biased against expansion by a compression spring 145 between its left-hand end and a fixed support 146. The interior of the bellows 143 communicates through a conduit 147 with the altitude-responsive control pressure, which may be either ambient atmospheric pressure or the discharge pressure of the compressor. At present we prefer to use compressor discharge pressure, which in a powerplant of the type illustrated is a function of ambient altitude pressure, ram pressure of flight (i. e. airspeed), and compressor speed. The bellows are of equal effective areas so that the common pressure in casing 65 acting on the exterior of both bellows alike has no net effect and the rod 141 is moved only in response to changes of the absolute value of the pressure communicated through conduit 147 to the interior of the bellows 143.

The upper end of lever 142 is biased by a spring 148 and forms a pivotal connection with the stem 149 of a pilot valve 150 having valve discs 151 secured to the stem 149 and cooperatively associated with two ports. The right-hand port is connected to the control oil supply line 34, and the left-hand port is connected by a conduit 152 to a rotary flow limiter 153 (which is similar to the device 126) having a slot 154, an inlet port 155, and a drain port 156. The pilot valve 150 is connected between its aforementioned ports by a conduit 157 to the pressure chamber of a servomotor 158, which includes a spring-biased piston 159 connected to a stem 160. The lower end of the lever 142 is biased by the spring 148 into engagement with a transverse pin on the stem 160.

Upon increasing altitude, the bellows 143 collapses causing clockwise movement of the lever 142 about its connection with the stem 160 by reason of the bias of spring 148, whereby the discs 151 of the pilot valve 150 are moved to the right, admitting high pressure fluid from the conduit 34 into the conduit 157 to increase the pressure in the chamber of the servomotor 158, and resulting in outward movement of the piston 159. This effects follow-up movement of the pilot valve by counterclockwise turning movement of the lever 142 about its pivotal connection with the rod 141, resulting in restoring movement of the discs 151 into aligned position with their respective ports.

It is important to note that upon decreasing pressure in bellows 143 (increasing altitude), the piston 159 moves quickly, the pressure in its chamber being quickly increased because the conduits 34, 157 are free from any restriction to flow. On the other hand, upon increasing pressure in belows 143 (decreasing altitude) the various elements are moved in the opposite direction. The valve discs 151 uncover the connection with the conduit 152, causing draining of fluid from the chamber of the servomotor 158 through conduit 157, pilot valve 150, conduit 152, restrictor 153, and drain port 156. The flow restrictor 153 retards this discharge of fluid from the servomotor 158 and consequently causes slow action of the altitude responsive mechanism upon increasing pressure in bellows 143 (decreasing altitude).

The servomotor piston 159 is arranged to vary the fuel pump outlet pressure and in view of the action just described causes a comparatively rapid drop of such outlet pressure upon decreasing pressure of the atmosphere and a slow rise of the outlet pressure upon increasing pressure of the atmosphere.

A feature of our invention is the variable lever assembly 91 connected between the stem 80 of the servomotor 81, the spring 90, and the piston rod 160 of the servomotor 158. Broadly, this variable ratio lever device includes two levers connected together by an adjustable fulcrum, which latter is positioned by the servomotor 158 of the altitude responsive means.

More specifically, the variable lever mechanism comprises a first lever 161 fulcrumed at its left-hand end by means of a pivot 162 and connected at its right-hand end to the spring 90 by means of an adjustable threaded rod 163. A second substantially parallel lever 164 is pivotally connected at its left-hand end to the stem 80 and is at its right-hand end held against a roller 165 mounted on a fixed axis. The pivotal connection between the first lever 161 and the second lever 164 is accomplished by means of a shaft 166 carrying an intermediate roller 167 and two outer rollers 168. The intermediate roller 167 bears against the lever 164 and the outer rollers 168 bear against depending edge portions 169 of the first lever 161. The shaft 166 is connected between the arms of a fork 170 which at its left-hand end is pivotally connected to the stem 160 of the servomotor 158. With this arrangement the force of the spring 90 is transmitted through the first lever 161 to the roller-carrying shaft 166, to the second lever 164 and thence to the stem 80 of the servomotor 81.

With the roller-carrying shaft or movable fulcrum 166 in a fixed position the operation of the servomotor 81 is the same as that of an ordinary servomotor having a piston biased by a spring of a suitable force.

At "shut-off pressure," defined as the pressure in the control chamber 59 when the stopcock 21 just closes, i. e. when fuel pressure at station 9 drops to zero, the levers 161, 164 are exactly parallel to each other and to the path of movement of variable fulcrum 167. In this condition, movement of the fulcrum 167 will have no effect on rod 80. Therefore the pressure in control chamber 59 corresponding to zero fuel pressure is substantially constant regardless of altitude. When the control pressure is at any value above shut-off pressure, the levers 161, 164 are at an angle to each other, and to the path of movement of the variable fulcrum 167, so that movement of the fulcrum recalibrates the regulator as described hereinafter.

With our arrangement the variable fulcrum 166, 167, 168 is positioned in response to changes of a pressure varying as a function of altitude. Upon increasing pressure in bellows 143, servomotor piston 159 moves to the left and thereby moves the variable fulcrum toward the left, increasing the effective moment arm between the spring 90 and the stem 80 of the servomotor 81 and producing a slight inward movement of the piston of the servomotor 81, thereby increasing the pressure in the control chamber 59 of the valve 44. This increase in pressure in the servomotor 81 is further aided by movement of the pilot valve disc 85 to admit fluid pressure from the supply pressure conduit 34 to the servomotor 81 and the control pressure chamber 59. Increasing pressure in the chamber 59, as explained before, results in increased fuel supply to the combustors and accordingly increased output of the powerplant. Also, the supply of fluid under pressure from the conduit 34 through the pilot valve to the servomotor 81 forces its piston back outward, thereby restoring the pilot valve discs 85 to their original aligned position with their respective ports.

Conversely upon decreasing pressure in bellows 143, the variable fulcrum 166, 167, 168 is moved toward the right, that is, toward the fixed pivot 165, causing outward movement of the piston of the servomotor 81 and of the valve discs 85 whereby fluid is drained from the port 84 of its pilot valve, resulting in decreasing pressure in the pressure chamber of the servomotor 81 and the control chamber 59 of the valve 44 and decreasing outlet pressure of the fuel supply pump 28.

The adjustment of the variable fulcrum 166, 167, 168 has the effect of recalibrating the force of the spring 90, the force being increased with increasing ambient atmospheric pressure and decreased with decreasing atmospheric pressure. This adjustment of the force of the spring 90 by action of the altitude responsive control has the additional effect of recalibrating the manual control mechanism, of which the spring 90 also forms a part. The variable lever 91 and the manual control linkage are so arranged that the full travel of the operator's control handle 22 (Fig. 1) from "closed" to "open" position always corresponds to full range of engine output from "idling" to "full load," regardless of altitude. The maximum safe output, that is, the "full load" rating of an aircraft gas turbine jet engine varies with altitude; and the variable lever mechanism 91 is also so designed that with the manual control handle 22 in a given position the powerplant will maintain a substantially fixed percentage of the "full load" output at varying altitudes. The force of spring 90 may be adjusted by means of the threaded pin 163 attached to the spring 90.

Thus it is seen that the altitude control includes means for varying the fuel pump discharge pressure in response to changes in a control pressure which is a function of altitude by varying the effective moment arm of a biasing force, the mechanism including a rotary flow restrictor arranged to effect slow response upon decreasing altitude and quick action upon increasing altitude.

The manual, speed, and temperature control means described above may be inoperative under particular operating conditions; but the altitude control is effective at all times to modify simultaneously the action of each of the other control devices.

Operation

The coordinated operation of the complete control system outlined above may be described briefly as follows.

All controls for the fuel system are integrated by means of suitable linkages connecting the various control devices to the single operating handle 22 (Fig. 1), which actuates the main control lever 24 through pushrod 25. From a comparison of the linkage shown diagrammatically in Fig. 1 with the components of the regulator shown in Fig. 2, it will be seen that manual control for the regulator 31 is effected through shaft 75, lever 76, and link 77. Recalibration of the speed governor is effected through shaft 23, carrying lever 23', which latter is connected to link 10 through a pin-and-slot lost motion connection 11. Stopcock 21 is actuated by lever 21' secured to the shaft 3 on which the main control lever 24 is mounted.

It should be noted that in Fig. 1 the throttle 22 and quadrant 22' are enlarged somewhat out of proportion to the remainder of the control linkage.

The above described linkage is so proportioned that as the control handle 22 is moved from the closed position, the stopcock 21 is quickly moved to full open position, say during the first 10 degrees of movement. During this movement the regulator shaft 75 moves, but the governor shaft 23 is permitted to remain stationary by the lost motion connection 11.

During the first 20 degrees of movement from the completely closed position, rotation of the shaft 75 counterclockwise operates to set the regulator by positioning lever 72 through cam 74 to call for an increasing fuel pressure at the point 9, and the speed of the engine rises to approximately 2600 R. P. M. (about 35 per cent of rated full load speed). During this first 20 degrees of travel the speed governor setting remains unchanged by reason of the lost motion connection 11, to hold the speed constant at 2600 R. P. M. If for some reason the speed should increase above 2600 R. P. M., the speed governor will operate to reduce it to that value; but as long as the speed remains below 2600 R. P. M. the speed governor is inoperative with the control handle set anywhere within the first 20 degrees of its movement, and regulation of output is by manual control acting directly on lever 72 through cam 74.

As the control handle passes the 20 degree position, the lost motion in the connection 11 is taken up and further movement of handle 22 serves to act through link 23' and shaft 23 to change the speed governor setting. From the 20 degree position to the full open position of throttle 22, manual control of the engine is effected by recalibration of the speed governor. During such operation, the manual control cam 74 on the shaft 75 does not touch the lever 72, but follows movement of the lever 72 with a slight clearance therebetween. With this arrangement the manual control cam 74 is always in a position to immediately take over control of the engine in the event the speed governor fails.

It will be obvious to those skilled in the art that the coordinating linkage of our control system could be so arranged that as the handle 22 moves from the closed position, first the stopcock is opened wide, then the manual control through shaft 75 is operative through most or all of the remainder of the travel of lever 22, with the speed governor never becoming effective except in the event of a transient emergency condition tending to produce a dangerous overspeed. At present, however, we prefer to use the manual control through shaft 75 during only a small portion of the range of throttle movement, securing the principal control through recalibration of the speed governor and using direct control through shaft 75 as a standby arrangement to become operative in the event the speed governor fails.

Our invention provides a fuel regulating system for aircraft gas turbine powerplants including means for recalibrating the manual control so that a given setting corresponds to a fixed percentage of full rated load regardless of altitude, and having speed and temperature responsive devices arranged to enable operation at maximum safe load with economy, while at the same time preventing dangerously high speeds or temperatures.

What we claim as new and desire to secure by Letters Patent of the United States, is:

1. In a regulating system for a thermal powerplant having a fuel control device for varying the fuel flow in response to a variable pressure signal, means for supplying control fluid at substantially constant pressure, a hydraulic motor with a first movable member biased by the pressure of control fluid in the motor in one direction, a pilot valve for regulating the flow of control fluid from said means for supplying to the motor, follow-up lever means connecting the pilot valve to said first movable member, means for positioning the follow-up lever means to vary the supply of control fluid to the motor, adjustable resilient means biasing the first movable member in opposition to the fluid pressure in said motor, and servo-motor means including a second movable member in engaging relation with said first member and the adjustable resilient biasing means for modifying the action of said biasing means on the first movable member in response to a pressure appurtenant to the operation of the powerplant, whereby the pressure supplied to the hydraulic motor is varied automatically regardless of the position of the follow-up lever.

2. In a regulating system for a powerplant having a fuel control device for controlling fuel flow in response to a variable pressure signal, a main control lever adapted to be positioned to select a desired load output, a hydraulic motor having a cylinder and a piston slidably disposed in the cylinder and forming a pressure chamber therewith, means for supplying a control fluid under pressure, pilot valve means for controlling the admission of control fluid to said chamber, follow-up lever means connecting the main control lever with said piston and the pilot valve means, spring means, variable ratio lever means connected between the spring and the piston to bias the piston against fluid pressure in the cylinder, and servo-motor means including a movable member connected to the variable ratio lever means for varying the biasing effect of the spring means on said piston in response to a pressure appurtenant to the operation of the powerplant, whereby the chamber pressure is automatically varied regardless of the position of the main control lever.

3. In a powerplant control system having variable delivery fuel supply means, the combination of first fluid pressure servo-motor means for varying the fuel delivery, second fluid pressure servo-motor means producing a signal pressure for positioning the first servo-motor means, said second servo-motor means including means for supplying a control fluid under pressure to a casing containing a first member movable in accordance with the pressure of control fluid supplied thereto, pilot valve means for regulating the admission of control fluid from the supply means to the second servo-motor means, conduit means communicating the pressure in the second servo-motor means to the first servo-motor means, and follow-up lever means connected to the pilot valve and said first member, a control member engaging the follow-up lever for positioning the pilot valve, adjustable means biasing said movable member in the decrease fuel direction, and servo-motor means including a second movable member engaging the adjustable biasing means for adjusting said biasing means in response to a pressure appurtenant to the operation of the powerplant whereby the control fluid pressure supplied to the first servo-motor means is varied automatically in accordance with said operating pressure of the powerplant regardless of the position of said control member.

4. In a rotary thermal powerplant having a hot gas generator and means for supplying fuel thereto at a variable rate, regulating means for the fuel supply including a movable member adapted to be positioned in accordance with the fuel delivery desired, a control member connected to the movable member for positioning the latter, means biasing the movable member to one extreme of its range of movement, a governor responsive to a rotational speed condition in the powerplant and including a member adapted to move the control member in the decrease fuel direction when said speed rises above a predetermined value, a thermal device responsive to a temperature condition in the powerplant and including a member adapted to move the control member in the decrease fuel direction when said temperature condition rises to a preselected value, and servo-motor means responsive to a pressure varying as a function of ambient atmospheric pressure for adjusting the force exerted on the movable member by said biasing means whereby the action of control member, speed governor, and thermal device are simultaneously modified in accordance with changes in said pressure.

5. In a fuel system for a gas turbine powerplant having a hot gas generator and variable fuel supply means including a fluid pressure-responsive fuel control member for adjusting the fuel supply, regulating means for supplying fluid at a variable control pressure to the fuel control member and including means for supplying a control fluid at substantially constant pressure, a single valve for regulating the supply of control fluid to the fuel control member, actuating means for said valve including a second fluid pressure responsive motor having a movable member biased in the increase fuel direction by the variable control pressure supplied to the fuel control member, adjustable means biasing said movable member in the decrease fuel direction in opposition to said variable control pressure, means for positioning said valve including a follow-up lever connecting said valve with said movable member, a control lever member engaging the follow-up lever for positioning the valve, means for adjusting the control lever to select a desired load output, governor means responsive to a rotational speed condition in the powerplant and adapted to move the control lever in the decrease fuel direction irrespective of the position of the load-selecting means, a thermal device responsive to a temperature condition appurtenant to the operation of the powerplant and also adapted to move the control lever in the decrease fuel direction independently of the position of the load selecting means, and means responsive to a pressure condition appurtenant to the operation of the powerplant for adjusting said biasing means to simultaneously modify the effect of the load selecting means, speed governor, and thermal device.

6. In a fuel control for a thermal powerplant, a hydraulic cylinder with a slidable piston defining a pressure chamber, means for supplying a control fluid under pressure to said chamber, means for varying the fuel supply rate in accordance with changes of pressure in said chamber, a spring adapted to bias said piston against the pressure of the control fluid, first means including a pilot valve connected to the piston by a follow-up lever for varying the pressure signal supplied to said chamber, a variable ratio lever mechanism connecting the spring to the piston, and means including a servo-motor connected to said mechanism and operable to vary the effective lever ratio in response to changes in a control pressure which is a function of ambient atmospheric pressure.

7. In regulating mechanism for a thermal powerplant, the combination of a hydraulic cylinder with a slidable piston defining a pressure chamber, means for supplying a control fluid under pressure to said chamber, means for varying the rate of fuel supply to the powerplant in accordance with changes of pressure in said chamber, a spring adapted to bias said piston against the pressure of the control fluid, first means including a pilot valve connected to said piston by a follow-up lever for varying the pressure signal supplied to said chamber, variable ratio mechanism connecting the spring to the piston, and means for varying the ratio of said mechanism including a hydraulic motor with a second pilot valve for regulating the flow of motive fluid to and from the motor, means responsive to a pressure varying as a function of ambient atmospheric pressure for positioning the second pilot valve, and means for limiting the rate of flow of motive fluid in the decrease altitude direction only whereby the regulating mechanism has a limited rate of response with decreasing altitude while effecting rapid response with increasing altitude.

8. In a thermal powerplant having a hot gas generator and means for supplying fuel to the generator at a variable rate, a regulator for the fuel supply means including a control member, means for positioning the control member to select a fuel rate corresponding to a desired output, a servo-mechanism including a thermal device responsive to a temperature condition appurtenant to the operation of the powerplant and a hydraulic motor with an actuating member adapted to engage the control member and move it in the decrease fuel direction, independently of the position of the output selecting means, means for supplying motive fluid under pressure, a pilot valve positioned by the thermal device and adapted to control the flow of fluid to and from the hydraulic motor, and means restricting the rate of flow of motive fluid to the motor in one direction only to limit the rate of response of the servo-motor with decreasing temperature while effecting rapid response with increasing temperature.

9. Regulating means for a thermal powerplant including a control member, means for positioning the control member to select a desired heat release rate, a thermal servo-mechanism responsive to a temperature condition appurtenant to the operation of the powerplant and including a hydraulic motor with an actuating member adapted to engage the control member through a lost motion connection to move the latter in the decrease output direction independently of the output selecting means, the degree of movement permitted by said lost-motion connection varying with the position of the control member and determining the temperature rise which will occur before the servo-mechanism becomes effective to decrease the output, means for supplying motive fluid under pressure, a pilot valve positioned by the thermal device for controlling the flow of fluid to and from the hydraulic motor, and means restricting the rate of flow of motive fluid in one direction only to limit the rate of response of the servo-mechanism with decreasing temperature while effecting rapid response with increasing temperature.

10. In a control system for a rotary thermal powerplant having a heat generator and means for varying the fuel supply thereto including a control member the position of which determines the rate of fuel supply, the combination of first hydraulic motor means for positioning the fuel control member, a second hydraulic motor including a casing defining a fluid pressure chamber and a member movable in said chamber in accordance with changes in the pressure therein, means for supplying a control fluid under pressure, pilot valve means for regulating the flow of control fluid from the supply means to said first and second hydraulic motors in parallel, follow-up lever means connecting the pilot valve and movable member of said second hydraulic motor, a control lever member engaging the follow-up lever to position the pilot valve, first resilient means biasing the control lever in the increase fuel direction, means for positioning the control lever in the decrease fuel direction against the bias of said first resilient means to select a desired load output, servo-mechanisms responsive to temperature and speed conditions in the powerplant for moving the control lever in the decrease fuel direction irrespective of the position of the load selecting means, second biasing means connected to said movable member through a variable ratio lever mechanism, and servo-motor means for varying the effective moment arm of said variable lever in accordance with a pressure condition appurtenant to the operation of the powerplant whereby the action of the load selecting means and speed and temperature responsive means are simultaneously modified in accordance with changes in said appurtenant pressure.

11. In a regulating system for a gas turbine powerplant having means for varying the output thereof, the combination of a control lever member adapted to be positioned in accordance with the output desired, means for manually positioning the control lever member to select a desired output, means responsive to a speed appurtenant to the operation of the powerplant for actuating the control lever in a direction to reduce the output regardless of the position of the output selecting means in order to limit said operating speed to a preselected value, means for adjusting said speed responsive device to vary said preselected value at which said device becomes effective to take control away from the load selecting means, and means connecting said adjusting means with the manual control means whereby while the speed responsive means is in operative engagement with the control lever member the output selecting means remains out of engagement with the control lever member but follows it with a predetermined clearance in position to quickly resume control in the event of failure of the speed responsive device.

12. In a cnotrol system for a rotary thermal powerplant for aircraft having a heat generator and means for varying the fuel supply thereto including a control member the position of which determines the rate of fuel supply, the combination of first hydraulic motor means for positioning the fuel control member, second hydraulic motor means including a casing defining a fluid pressure chamber and a member movable in said chamber in accordance with changes in the pressure therein, means for supplying a control fluid under pressure, pilot valve means for regulating the flow of control fluid from the supply means to the first and second hydraulic motors in parallel, follow-up lever means connecting the pilot valve and movable member of said second hydraulic motor, a control lever member engaging the follow-up lever to position the pilot valve, first resilient means biasing the control lever in the increasing fuel direction, means for positioning the control lever in the decrease fuel direction against the bias of said first resilient means to select a desired load output, a first servo-mechanism responsive to a speed condition in the powerplant and having an actuating member for moving the control lever through a lost motion connection in the decrease fuel direction irrespective of the position of the load selecting means, the degree of lost motion permitted by said connection being proportional to the speed rise which will occur before the servo-mechanism becomes effective to reduce the fuel supply, a second servo-mechanism responsive to a temperature condition in the powerplant and having an actuating member adapted to move the control lever through a lost motion connection in the decrease fuel direction, the degree of motion permitted by said connection being proportional to the temperature rise which will occur before the second servo-mechanism becomes effective, the degree of free movement in said lost motion connections varying as a function of control lever position whereby the speed and temperature rises permitted by the respective servos vary as a function of load setting, second means biasing said movable member through a variable ratio lever mechanism against the fluid pressure in said pressure chamber, and a third compensating servo-mechanism for varying the effective moment arm of said variable lever in accordance with a pressure condition which varies as a function of ambient atmospheric pressure, whereby the action of the load selecting means and speed and temperature servos are simultaneously modified in accordance with changes in atmospheric pressure, said thermal servo-mechanism including a motor with means limiting the rate of movement effected thereby in one direction only to limit the rate of response thereof with decreasing temperature while effecting rapid response with increasing temperature, said compensating servo-mechanism including a motor with means for limiting the rate of movement in one direction only whereby the rate of response thereof is limited with decreasing altitude while effecting rapid response with increasing altitude.

MARTIN A. EDWARDS.
DONALD E. GARR.
HUGH M. OGLE.

REFERENCES CITED

The following references are of record in the file of this patent:

UNITED STATES PATENTS

| Number | Name | Date |
|---|---|---|
| 1,372,502 | Grun | Mar. 22, 1921 |
| 1,549,745 | Church | Aug. 18, 1925 |
| 1,632,471 | Girardier et al. | June 14, 1927 |
| 1,689,893 | Royce | Oct. 30, 1928 |
| 1,925,987 | King et al. | Sept. 5, 1933 |
| 2,136,959 | Winfield | Nov. 15, 1938 |
| 2,177,098 | Doe et al. | Oct. 24, 1939 |
| 2,219,994 | Jung | Oct. 29, 1940 |
| 2,245,562 | Becker | June 17, 1941 |
| 2,264,262 | Erbguth | Nov. 25, 1941 |
| 2,306,953 | Jung | Dec. 29, 1942 |
| 2,313,002 | Mennesson | Mar. 2, 1943 |
| 2,336,232 | Doran | Dec. 7, 1943 |
| 2,355,759 | Stokes | Aug. 15, 1944 |
| 2,384,282 | Chandler | Sept. 4, 1945 |
| 2,397,213 | Smith | Mar. 26, 1946 |
| 2,397,657 | Goddard | Apr. 2, 1946 |
| 2,419,171 | Simpson | Apr. 15, 1947 |
| 2,423,417 | Stokes | July 1, 1947 |
| 2,435,902 | Reggio | Feb. 10, 1948 |
| 2,439,325 | Wiesendanger | Apr. 6, 1948 |
| 2,489,586 | Ray | Nov. 29, 1949 |
| 2,525,460 | Roesch | Oct. 10, 1950 |
| 2,538,582 | Mordell et al. | Jan. 16, 1951 |
| 2,538,606 | Udale | Jan. 16, 1951 |

FOREIGN PATENTS

| Number | Country | Date |
|---|---|---|
| 160,976 | Switzerland | June 16, 1933 |